(12) United States Patent
Kato

(10) Patent No.: US 7,995,763 B2
(45) Date of Patent: Aug. 9, 2011

(54) USER APPARATUS AND PROGRAM

(75) Inventor: Takehisa Kato, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 629 days.

(21) Appl. No.: 12/164,402

(22) Filed: Jun. 30, 2008

(65) Prior Publication Data

US 2009/0019279 A1    Jan. 15, 2009

(30) Foreign Application Priority Data

Jul. 3, 2007  (JP) ................. 2007-175425

(51) Int. Cl.
*H04L 9/08* (2006.01)
(52) U.S. Cl. ............................. 380/278; 705/55; 726/27
(58) Field of Classification Search .................. 380/277, 380/278, 283, 286; 705/50–52, 55, 57, 71; 726/26, 27
See application file for complete search history.

(56) References Cited

U.S. PATENT DOCUMENTS

| | | | | |
|---|---|---|---|---|
| 6,088,454 | A * | 7/2000 | Nagashima et al. | 380/286 |
| 6,182,214 | B1 * | 1/2001 | Hardjono | 713/163 |
| 2002/0049679 | A1 * | 4/2002 | Russell et al. | 705/52 |
| 2005/0018854 | A1 * | 1/2005 | Yamamoto et al. | 380/277 |
| 2006/0282389 | A1 * | 12/2006 | Gupte | 705/52 |
| 2008/0027864 | A1 * | 1/2008 | Lin et al. | 705/50 |

FOREIGN PATENT DOCUMENTS

JP    2003-273819    9/2003

OTHER PUBLICATIONS

Ad Shamir, "How to Share a Secret", Programming Techniques, vol. 22, No. 11, Nov. 1979, pp. 612-613.

* cited by examiner

*Primary Examiner* — Gilberto Barron, Jr.
*Assistant Examiner* — Malcolm Cribbs
(74) *Attorney, Agent, or Firm* — Oblon, Spivak, McClelland, Maier & Neustadt, L.L.P.

(57) ABSTRACT

A user apparatus cannot acquire as many distribution keys $K_t, \ldots$ as a threshold value, to restore a content encryption key $K_M$, unless it decrypts as many encrypted sub-content items as the threshold value after it has played back a sub-content item $SC_1$. The user apparatus monitors the state in which the sub-content is being played back. It outputs a warning when the sub-content is in fast-forwarding state or skipping state. If the playback state is not returned to one before the fast forwarding or skipping, in spite of the warning, the user apparatus will erase the distribution keys acquired in the fast-forwarding state or skipping state.

6 Claims, 10 Drawing Sheets

| Content playback information | | | |
|---|---|---|---|
| Content ID | Playback part | Playback start time | Number of distribution keys acquired |
| ab0001 | 1 | 1:15:24 | 0 |
| as0010 | 0 | 0:14:32 | 5 |
| fj0145 | 1 | 0:44:32 | 0 |
| ... | ... | ... | ... |

| Content playback information | | | | |
|---|---|---|---|---|
| Content ID | Playback part | Number of distribution keys acquired | Sub-content items played back | Playback start time |
| ab0001 | 0 | 0 | 00000····000 | — |
| as0010 | 0 | 3 | 10110····000 | — |
| fj0145 | 1 | 0 | 00000····000 | 0:30:14 |
| ... | ... | ... | ... | ... |

FIG. 9

| Content playback information | | | | |
|---|---|---|---|---|
| Content ID | Playback part | Number of distribution keys acquired | Sub-content items played back | Playback start time |
| ab0001 | 0 | 0 | 00000····000 | — |
| as0010 | 0 | 3 | 10110····000 | — |
| fj0145 | 1 | 0 | 00000····000 | 0:30:14 |
| ... | ... | ... | ... | ... |

| Number | Encrypted sub-content | Number | | ... | Number | |
|---|---|---|---|---|---|---|
| 1 | | 2 | | | n-1 | |

FIG. 10

|  | SC#1 | C₁ | SC#2 | C₂ | ..... | SC#m-1 | Cm-1 | SC#m | E(K_M,C_m) |
|---|---|---|---|---|---|---|---|---|---|
| First key arrangement | k₁,k₂, ...,k_{n-1} |  | k₁,k₂, ...,k_{n-1} |  | ..... | k₁,k₂, ...,k_{n-1} |  | k₁,k₂, ...,k_{n-1} |  |
| Second key arrangement | k₁ |  | k₂ |  | ..... | k_{n-2} |  | k_{n-1} |  |

FIG. 13

Content playback information

| Content ID | Playback part | Playback start time | Number of distribution keys acquired |
|---|---|---|---|
| ac0001 | M4 | 00:00:25 | 2 |
| ... | ... | ... | ... |

FIG. 15

USER APPARATUS AND PROGRAM

CROSS-REFERENCE TO RELATED APPLICATIONS

This application is based upon and claims the benefit of priority from prior Japanese Patent Application No. 2007-175425, filed Jul. 3, 2007, the entire contents of which are incorporated herein by reference.

BACKGROUND OF THE INVENTION

1. Field of the Invention

The present invention relates to a user apparatus and a program, both for use in a content distribution/presenting system, for example to the invention relates to a user apparatus and a program, which are designed to prevent any content to be viewed, from being played back without playing back sub-content items such as commercials.

2. Description of the Related Art

In the field of content distribution, there has recently risen a new service of stream-distributing free content items, each headed with the sponsor's commercial.

For this content distribution service, it is important that users view the sponsors' commercials. In view of this, a method has been developed, in which a questionnaire is sent out right after a commercial video has been transmitted, asking the viewers if they have viewed the commercial, and the main-content item is then stream-distributed to the terminals of only those users who have answered in affirmative to the questionnaire.

Prior-art references that seem related to the present invention are, for example, Jpn. Pat. Appln. KOKAI Publication No. 2003-273819 and A. Shamir, "How to share a secret," Communications of the ACM, 22, 11, pp. 612-613 (1979).

The above-mentioned method, in which the questionnaire is sent out, is disadvantageous, however. Once the main-content item has been saved in a local environment, such as the user terminal, the user can view the main-content item, without the necessity of viewing the commercial provided at the head of the content.

BRIEF SUMMARY OF THE INVENTION

An object of the present invention is to provide a user apparatus and a program, which can disable the user from play back any content item unless he or she plays back the sub-content (e.g., commercial) appended to the content.

According to an aspect of the present invention, there is provided user apparatus capable of communicating with a content distribution apparatus, comprising: a storage device configured to store a threshold value k, sub-content item $SC_1$, an encryption key $K_{SC}$, n−1 encrypted sub-content items $E(K_{SC1}, K1//SC_2), \ldots, E(K_{SC}, K_{n-1}//SC_n)$ and an encrypted content item $E(K_M, C_m)$, when the content distribution apparatus encrypts a content to view, with a content encryption key $K_M$, thereby generating an encrypted content item $E(K_M, C)$, performs the (k, n) threshold secret sharing scheme on the content decryption key $K_M$, using the threshold value k that is equal to or smaller than the number n of sub-content items $SC_1, \ldots, SC_n$ able to be played back before the content item C is played back, thereby generating n distribution keys $K_1, \ldots, K_{n-1}, K_n$ (where $3 \leq n$) and a sub-content encryption key $K_{SC}$, concatenates the n−1 distribution keys $K_1, \ldots, K_{n-1}$ included in the n distribution keys to the n−1 sub-content items $SC_2, \ldots, SC_n$ included in the n sub-content items, respectively, thereby generating n−1 concatenated data items $K_1//SC_2, \ldots, K_{n-1}//SC_n$, encrypts the n−1 concatenated data items $K_1//SC_2, \ldots, K_{n-1}//SC_n$, one by one, based on the sub-content encryption key $K_{SC}$, thereby generating n−1 encrypted sub-content items $E(K_{SC}, K1//SC_2), \ldots, E(K_{SC}, K_{n-1}//SC_n)$, and distributes one sub-content not included in the concatenated data items, the sub-content encryption key $K_{SC}$, the n−1 encrypted sub-content items $E(K_{SC}, K1//SC_2), \ldots, E(K_{SC}, K_{n-1}//SC_n)$ and the encrypted content item $E(K_M, C)$, one after another; a first decryption device configured to decrypt the encrypted sub-content items $E(K_{SC}, K1//SC_2), \ldots,$ one after another, based on the sub-content encryption key $K_{SC}$ stored in the storage device, thereby generating the concatenated data items $K_1//SC_2, \ldots$ ; a first playback device configured to play back, one after another, the first sub-content item $SC_1$ stored in the storage device and stored sub-content items $SC_2, \ldots$ included in the concatenated data items generated by the first decryption device; a distribution key storage device configured to store, one after another, the distribution keys $K_1, \ldots$ included in the concatenated data items generated by the first decryption device; a content encryption key restoration device configured to perform (k, n) threshold secret sharing scheme, based on the decryption key $K_1, \ldots$ stored in the distribution key storage device, thereby restoring the content decryption key $K_M$; a second decryption device configured to decrypt the encrypted content item $E(K_M, C)$ stored in the storage device, based on the content decryption key $K_M$ restored; a second playback device configured to play back the content item C decrypted; a comparing device configured to compare the threshold value k with the number i of distribution keys stored in the distribution key storage device ($1 \leq i \leq n-1$); a warning device configured to monitor the playback state in the first playback device and the result of comparison performed by the comparing device, thereby outputting a warning and first inquiry information when the number i of distribution keys is smaller than the threshold value k (i<k) and when the playback state is either fast forwarding or skipping, the warning indicating that the content item C cannot be played back unless the playback state returns to one before the fast forwarding or skipping, and the first inquiry information asking whether the playback state should be returned to one before the fast forwarding or skipping; a playback position correction device configured to correct the position where the first playback device plays back the sub-content, to a position where the first playback device played back a sub-content before the fast forwarding or the skip is performed, when first response information requesting that the position should be so corrected is input in reply to the warning and the first inquiry information; and a distribution key deletion device configured to erase the distribution key acquired in the fast-forwarding state or skipping state from the distribution key storage device, when the first response information requesting that the position should not be so corrected is input in reply to the warning and the first inquiry information.

This aspect of the present invention is concerned with a "user apparatus." Nonetheless, the invention covers a "method," a "program," and a "computer-readable storage medium." The same holds true of a content distribution apparatus.

According to another aspect of the invention, unless as many encrypted sub-content items as a threshold value are acquired after a sub-content item $SC_1$ has been played back, as many distribution keys $K_i, \ldots$ as the threshold value cannot be acquired in order to restore a content encryption key $K_M$. The state in which the sub-content is being played back is monitored. A warning is output when the sub-content is in fast-forwarding state or skipping state. If the playback state is not returned to one before the fast forwarding or skipping, in spite of the warning, the distribution keys acquired in the fast-forwarding state or skipping state will be erased. Thus, the content to be viewed cannot be played back unless the sub-content is played back.

BRIEF DESCRIPTION OF THE SEVERAL VIEWS OF THE DRAWING

FIG. 9 is a table showing modified content playback information used in the first embodiment;

FIG. 10 is a schematic diagram explaining the content playback information used in a modified embodiment;

FIG. 13 is a schematic diagram explaining the key arrangement set in encrypted sub-content items distributed and presented in the second embodiment;

FIG. 15 a table explaining the configuration of content information played back in the third embodiment.

DETAILED DESCRIPTION OF THE INVENTION

Embodiments of the present invention will be described, one by one, with reference to the accompanying drawings. The apparatuses that will be described below can each be composed of hardware only or of hardware resource and software. Any apparatus composed of hardware resource and software uses the programs that have been installed via a network or from recording media M1 and M2 into the computers incorporated in the apparatuses 100 and 200 and that implement the functions of the apparatuses 100 and 200. Various signs will be used herein to explain the present invention. They are defined as follows:

$SC_i$: Sub-content items divided, such as commercials ($1 \leq i \leq n$, wherein n is the divisor);

$K_M$, $K_{Mj}$: Content encryption keys for encrypting content items ($1 \leq j \leq m$);

$K_i$, $K_{Mj}$, i: Distribution keys that are encryption keys allocated to content items ($1 \leq i \leq n-1$, $1 \leq j \leq m$);

C, $C_j$: Main-content items ($1 \leq j \leq m$);

E(K,D): Functions for encrypting data D with key K; and $K_{SC}$: Sub-content encryption key for encrypting a distribution key and a sub-content item.

First Embodiment

Figure 1:
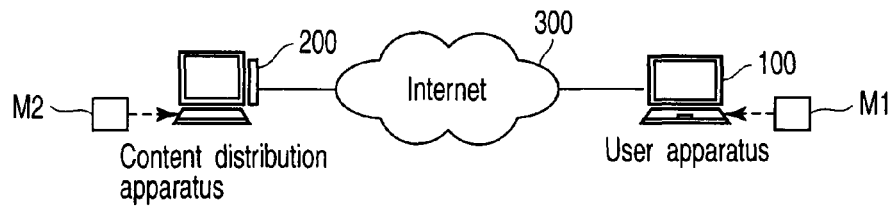
FIG. 1 is a schematic diagram showing the configuration of a content distribution/representing system according to a first embodiment of the present invention.

FIG. 1 is a schematic diagram that shows the configuration of a content distribution/representing system according to a first embodiment of the present invention. The content distribution/representing system comprises a user apparatus 100 and a content distribution apparatus 200. The user apparatus 100 and the content distribution apparatus 200 can communicate with each other via a network 300. The network 300 may be one open to anyone, such as the Internet. To exchange secret information, such as the user's authentication information and encryption key information, between the user apparatus 100 and the content distribution apparatus 200, it is desirable to employ an encryption communications system such as Secure Socket Layer (SSL).

Figure 2:
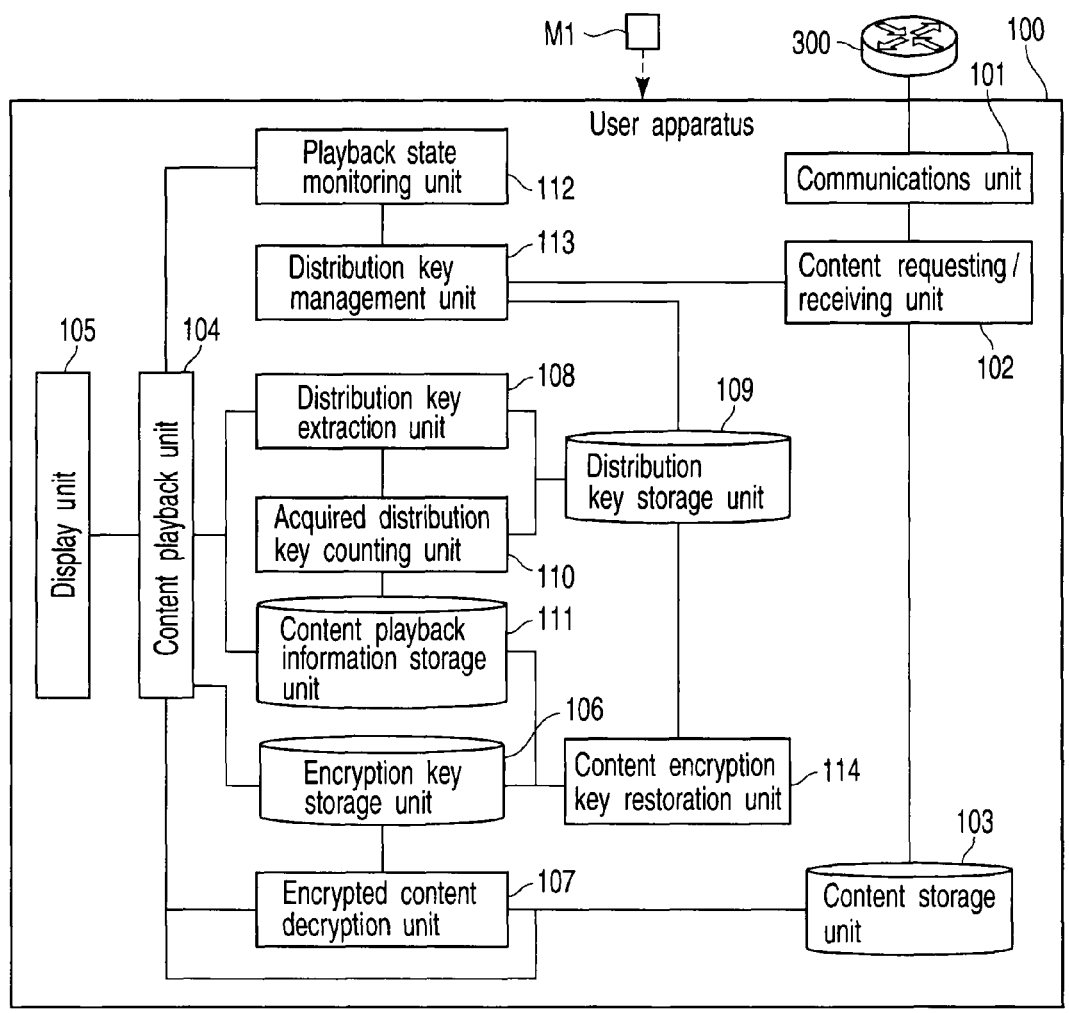
FIG. 2 is a schematic diagram showing a user apparatus provided in the first embodiment.
Figure 3:
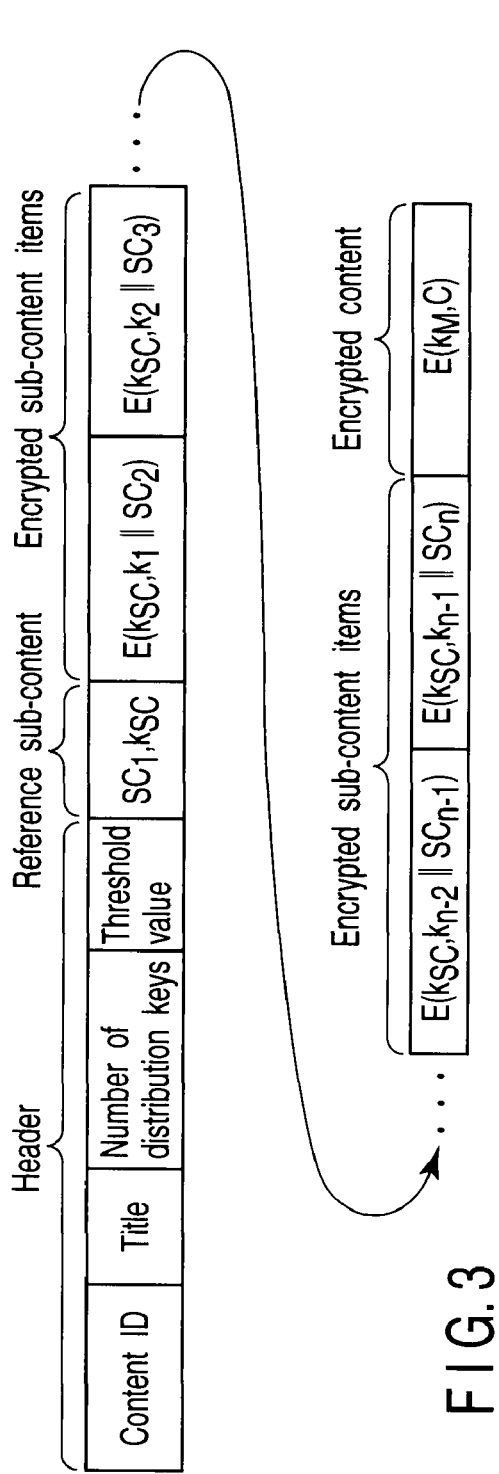
FIG. 3 is a schematic diagram representing the structure of data to be stream-distributed in the first embodiment.

The user apparatus 100 is, for example, a general-purpose computer such as personal computer (hereinafter referred to as PC). As shown in FIG. 2, the user apparatus 100 comprises a communications unit 101, a content requesting/receiving unit 102, a content storage unit 103, a content playback unit 104, a display unit 105, an encryption key storage unit 106, an encrypted content decryption unit 107, a distribution key extraction unit 108, a distribution key storage unit 109, an acquired distribution key counting unit 110, a content playback information storage unit 111, a playback state monitoring unit 112, a distribution key management unit 113, and a content encryption key restoration unit 114.

The communications unit 101 has a communications interface function of connecting the user apparatus 100 to the network 300.

The content requesting/receiving unit 102 has the following functions (f102-1) to (f102-3).

(f102-1): To request, via the communications unit 101, that the content distribution apparatus 200 should provide encrypted content items, when operated by the user;

(f102-2): To supply, to the distribution key management unit 113, the number of distribution keys and the threshold value, both contained in the header information included in the stream data distributed from the content distribution apparatus 200 and received via the communication unit 101; and (f102-3): To write entire stream data distributed, in its entirety, into the content storage unit 103.

The stream data distributed is composed of header information, a reference sub-content, an encrypted sub-content, and an encrypted content.

The header information contains a content ID, title information, number of distribution keys, and a threshold value. It may contain other information items in addition to these.

The reference sub-content ($SC_1$, $K_{SC}$) consists of the first ($SC_1$) of n sub-content items and a sub-content encryption key $K_{SC}$ for decrypting the first sub-content item $SC_1$. The first sub-content item $SC_1$ is, for example, a message image such as directions for viewing the content. The sub-content encryption key $K_{SC}$ may be concatenated to the sub-content item $SC_1$. Rather, it may better be embedded, as electronic watermark, in the sub-content item $SC_1$, which may be a moving image or a still image. For the simplicity of explanation, however, it is assumed here that the sub-content encryption key $K_{SC}$ is concatenated to the sub-content item $SC_1$. The encryption key used is prescribed in the content distribution/representing system. Encryption keys or encryption algorithms, each having a different size, may be used for content items, respectively. In this case, the data items representing the size and position of the encryption key or algorithm used are contained in the header information.

There are n−1 encrypted sub-content items E, i.e., $E(K_{SC}, K_1//SC_2), \ldots, E(K_{SC}, K_{n-1}//SC_n)$. Symbol "//" indicates concatenation. Each encrypted sub-content item $(K_{SC}, K_i//SC_{i+1})$ has been obtained by encrypting the concatenation data $K_i//SC_{i+1}$ for the ith distribution key $K_i$ and the (i+1)th distribution key $SC_{i+1}$, using the sub-content encryption key $K_{SC}$.

Figure 4:
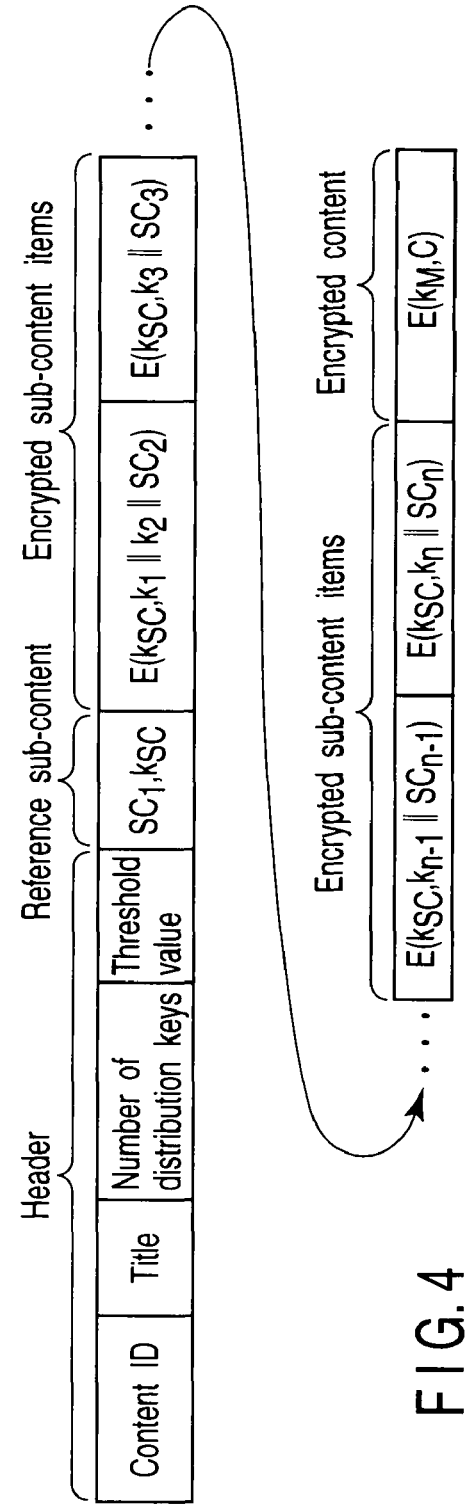
FIG. 4 is a schematic diagram representing a modified structure of data to be stream-distributed in the first embodiment.

The concatenation data contained in any encrypted sub-content is not limited to one that concatenates one distribution key Ki and one sub-content item SCi+1. It may be one that concatenates, as shown in FIG. 4, a plurality of distribution keys $K_1$ and $K_2$ to one sub-content item $SC_2$. That is, two or more distribution keys may be concatenated to an important sub-content. Thus, any important sub-content is played back and displayed to the user, without fail.

Assume that the threshold value k=4 and n=5. Then, the distribution keys $K_1$ and $K_2$ are concatenated to the sub-content item $SC_2$ that is important, and distribution keys $K_3$, $K_4$ and $K_5$ are concatenated to the sub-content items $SC_3$, $SC_4$ and $SC_5$, respectively, which are not important. In this case, the threshold value k will not reach 4 even if the user viewed the sub-content items $SC_3$, $SC_4$ and $SC_5$, which are not important. Hence, the encrypted content item $E(K_M, C)$ cannot be decrypted. Thus, if distribution keys K are so arranged that r<k, where r is the number of distribution keys acquired from an unimportant sub-content item SC, any important sub-content can be displayed without fail. There may more unimportant sub-content items than a preset distribution number (e.g., 5). In this case, distribution keys $K_3$, $K_4$ and K, which do not exceed the threshold value in number, are assigned to the unimportant sub-content items, each possibly to two or more unimportant sub-content items, in order to limiting the number of distribution keys that can be acquired from unimportant sub-content items. In the above-mentioned instance, unimportant sub-content items $SC_6$, $SC_7$ and $SC_8$ may be added and distribution keys $K_3$, $K_4$ and $K_5$ may be concatenated to these unimportant sub-content items $SC_6$, $SC_7$ and $SC_8$, respectively. Then, only three distribution keys can be acquired even if the user views all unimportant sub-content items $SC_6$, $SC_7$ and $SC_8$. Consequently, the number of distribution keys acquired, i.e., keys $K_3$, $K_4$ and $K_5$, does not reach the threshold value of 4. In this case, too, the encrypted content item $E(K_M, C)$ cannot be decrypted.

Note that the encrypted content item $E(K_M, C)$ has been obtained by encrypting the main-content item C with content decryption key $K_M$.

The content storage unit 103 is a storage device into which data can be written from the content requesting/receiving unit 102, and from which data can be read into the content playback unit 104 and encrypted content decryption unit 107. The content storage unit 103 can store the entire stream-distributed data that consists of the header information, reference sub-content, encrypted sub-content items and encrypted content.

The content playback unit 104 has the following functions (f104-1) to (f104-12).

Figures 5, 7:
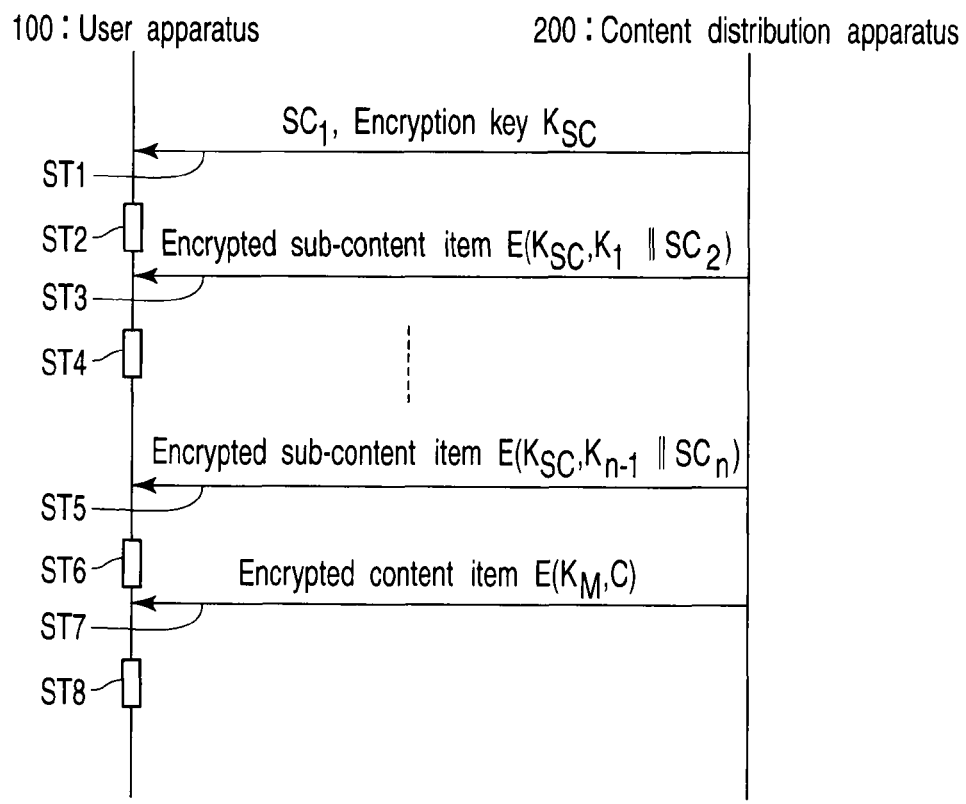
FIG. 5 is a table explaining the configuration of content playback information used in the first embodiment.
FIG. 7 is a sequence diagram explaining the operation the first embodiment performs.

(f104-1): To read the header information and reference sub-content $(SC_1, K_{SC})$ stored in the content storage unit 103 and supplies them to the display unit 105 so that the sub-content item $SC_1$ may be played back;

(f104-2): To write the sub-content encryption key $K_{SC}$ into the encryption key storage unit 106;

(f104-3): To supply, to the display unit 105, the sub-content items $SC_2, \ldots, SC_n$ included in the concatenated data items $K_1//SC_2, \ldots, K_{n-1}//SC_n$ received from the encrypted content decryption unit 107;

(f104-4): To supply, to the display unit 105, the content item C received from the encrypted content decryption unit 107;

(f104-5): To write, into the content playback information storage unit 111, such content playback information as shown in FIG. 5, in order to play back a new content;

(f104-6): To update the content playback information if the user stops the process of playing back the content;

(f104-7): To output, to the display unit 105, a message telling the receipt of distribution keys when the number of distribution keys acquired reaches the threshold value in the content playback information;

Note that content playback information includes content IDs, playback part information items, playback start time information items, and numbers of distribution keys acquired.

The playback part information is flag information showing that the playback of the sub-content or the main-content has been stopped. If the playback part information is "0," it shows that the playback of the sub-content has been stopped. If it is "1," it shows that the playback of the main-content has been stopped. Nonetheless, the playback part information may shows the other way around, in accordance with its value "0" or "1." Further, the playback part information need not be limited a one-bit flag. If it consists of a plurality of bits, it can identify the sub-content the playback of which has been stopped. If the playback part information consists of, for example, 4 bits, it can show at which one of 15 sub-content items the playback has been stopped. That is, the playback part information can be composed of m bits ($m=\log_2 n$) that represent the ordinal number I of the sub-content item $SC_i$ at which the playback has been stopped.

The playback start time information represents the time from the start of playing back the sub-content or the main-content to the interruption of playing back thereof. In the case of FIG. 5, the playback start time information shows when the playback of the sub-content starts if the flag of the playback part information is "0," and when the playback of the main-content starts if the flag of the playback part information is "1." Thus, the playback of the content whose ID is "as0010" is interrupted while the sub-content is being played back, and is resumed upon lapse of 14 minutes and 21 seconds from the playback start of the sub-content.

The number of distributions acquired keys is written in the acquired distribution key counting unit 110. It indicates how many distribution keys have been acquired by the distribution key extraction unit 108.

(f104-8): To play back desired content item C after the first sub-content item $SC_1$ has been played back if the ID of the content item C does not exist in the content playback information list (stored in the content playback information storage unit 111), when the playback is started for the next time.

(f104-9): To determine whether the playback has been interrupted while the sub-content is being played back or while the main-content is being played back, from the flag of the playback part information recorded in the content playback information list, if the ID of the main-content exists in the content playback information list;

(f104-10): To output the inquiry information to the display unit 105, in accordance with the playback start time information, thereby asking the user of the user apparatus 100 whether the playback should be resumed at the part where the playback has stopped and prompting the user to input response information;

(f104-11): To start the playback at the part where the playback has stopped if the response information input by the user shows that the playback should be resumed at that part, or at the beginning of the content if the response information shows that the playback need not be resumed at the part where the playback has stopped; and (f104-12): To update the playback start time associated with the playback time information representing a playback period (from the start of playback to the interruption thereof), if the playback is interrupted again.

In the present embodiment, the user must view the sub-content to acquire a number of distribution keys $K_i$ (which corresponds to the threshold value), if he or she has interrupted the playback of the main-content. Nevertheless, the embodiment may be so modified that the user need not acquire all distribution keys $K_i$, if he or she has once acquired as many distribution keys $K_i$ as the threshold value. In this modified embodiment, either the distribution keys $K_i$ acquired or the content decryption key $K_M$ restored must be safely managed safety in the user apparatus 100.

The display unit 105 is configured to display the images represented by the sub-content item $SC_i$ and content item C it has received from the content playback unit 104. Further, the display unit 105 has the function of causing an audio output unit (not shown) to generate the sound represented by the sub-content item $SC_i$ and content item C.

The encryption key storage unit 106 is a storage device into which data can be read from the content playback unit 104 and content encryption key restoration unit 114. That is, the unit 106 stores the sub-content encryption key $K_{SC}$ and the content decryption key $K_M$.

The encrypted content decryption unit 107 has the following functions (f107-1) to (f107-4).

(f107-1): To decrypt the sub-content items E ($E(K_{SC}, K_1// SC_2), \ldots, E(K_{SC}, K_{n-1}//SC_n)$) stored in the content storage unit 103, one after another, based on the sub-content encryption key $K_{SC}$ that is stored in the encryption key storage unit 106;

(f107-2): To supply, to the content playback unit 104, the concatenated data items $K_1//SC_2, K_{n-1}//SC_n$ that have been obtained by decrypting the sub-content items E;

(f107-3): To decrypt the encrypted content item $E(K_M, C)$ stored in the content storage unit 103, based on the content decryption key $K_M$ stored in the encryption key storage unit 106; and (f107-4): To supply the content item C, thus decrypted, to the content playback unit 104.

The distribution key extraction unit 108 has the function of extracting distribution keys $K_1, \ldots, K_{n-1}$ from the concatenated data items $K_1//SC_2, \ldots, K_{n-1}//SC_n$ that have been supplied to the content playback unit 104 and then writing the distribution keys $K_1, \ldots, K_{n-1}$ into the distribution key storage unit 109.

The distribution key storage unit 109 is a storage device into which data can be written from the distribution key extraction unit 108 and distribution key counting unit 110, and from which data can be read into the distribution key counting unit 110 and content encryption key restoration unit 114. The distribution key storage unit 109 is configured to store distribution keys $K_1, \ldots, K_{n-1}$.

The distribution key counting unit 110 has the following functions (f110-1) and (f110-2).

(f110-1): To count the distribution keys stored in the distribution key storage unit 109, while the distribution key extraction unit 108 is operating;

(f110-2): To write the number of distribution keys acquired, which have been counted, into the content playback information stored in the content playback information storage unit 111.

The content playback information storage unit 111 is a storage device into which data can be written from the content playback unit 104 and distribution key counting unit 110, and from which data can be read into the content playback unit 104 and content encryption key restoration unit 114. As seen from FIG. 5, the content playback information storage unit 111 is configured to store content playback information that includes at least content IDs, playback part information items, playback start time information items, and numbers of distribution keys acquired.

The playback state monitoring unit 112 has the following functions (f112-1) to (f112-6).

(f112-1): To compare threshold value k with the number of distribution keys stored in the distribution key storage unit 109 (i.e., number i of distribution keys), through the distribution key management unit 113 (note: $1 \leq I \leq n-1$);

(f112-2): To monitor the state in which sub-content items $SC_2, \ldots, SC_n$ are being played back in the content playback unit 104.

(f112-3): To hold the playback time information at the fast-forwarding start time or at the skip start time if the number of distribution keys acquired is smaller than the threshold value and if the playback state is either the fast-forward state or the skipping state, and to output an warning indicating that content item C cannot be played back and inquiry information asking whether the playback state should return to one before the fast-forwarding state or the skipping state;

(f112-4): To correct the position where the content playback unit 104 should play back the sub-content, before the fast forwarding or the skip is performed, in accordance with the playback time information available when the fast forwarding or skip is started, if the user has input response information requesting that the playback state should return to one before the fast-forwarding state or the skipping state;

(f112-5): To control the content playback unit 104, causing the same to keep operating after the position has been corrected; and (f112-6): To make the distribution key management unit 113 erase the distribution keys $K_i$ acquired in the fast-forwarding state or skip state, from the distribution key storage unit 109 if the user ignores the warning and inputs negative response information.

The warning indicating that content item C cannot be played back may contain a message telling the user that the distribution keys $K_i$ will be erased from the distribution key storage unit 109 if the playback state is not returned to one before the fast-forwarding state or the skipping state.

The playback state monitoring unit 112 does nothing if it detects that the sub-content item $SC_i$ is temporarily stopped or fed in units of frames. Even if the playback state monitoring unit 112 detects that sub-content item $SC_i$ is fast forwarded or skipped, it will do nothing as long as the number of distribution keys acquired remains equal to or larger than the threshold value.

The distribution key management unit 113 has the following functions (f113-1) to (f113-4).

(f113-1): To hold the number of distribution keys and the threshold value, both received from the content requesting/receiving unit 102;

(f113-2): To calculate the number of distribution keys stored in the distribution key storage unit 109, thereby acquiring the data representing the number of distribution keys acquired;

(f113-3): To supply the threshold value and number of distribution keys acquired to the playback state monitoring unit 112;

(f113-4): To erase the distribution keys Ki from the distribution key storage unit 109, under the controlled of the playback state monitoring unit 112.

The distribution key management unit 113 is configured to hold the number of distribution keys and the threshold value, both received from the content requesting/receiving unit 102. Instead, it may be configured to read the number of distribution keys and the threshold value, both from the content storage unit 103.

The content encryption key restoration unit 114 has the following functions (f114-1) and (f114-2).

(f114-1): To restore the content decryption key $K_M$ based on the distribution keys $K_1, \ldots, K_{n-1}$ stored in the distribution key storage unit 109, by means of a so-called (k, n) threshold secret sharing scheme; and (f114-2): To write the content decryption key $K_M$, thus restored, into the encryption key storage unit 106.

The content distribution apparatus 200 is a general-purpose computer of sever type that works on an operating system (hereinafter referred to as OS) such as Windows™ and UNIX™.

Figure 6:
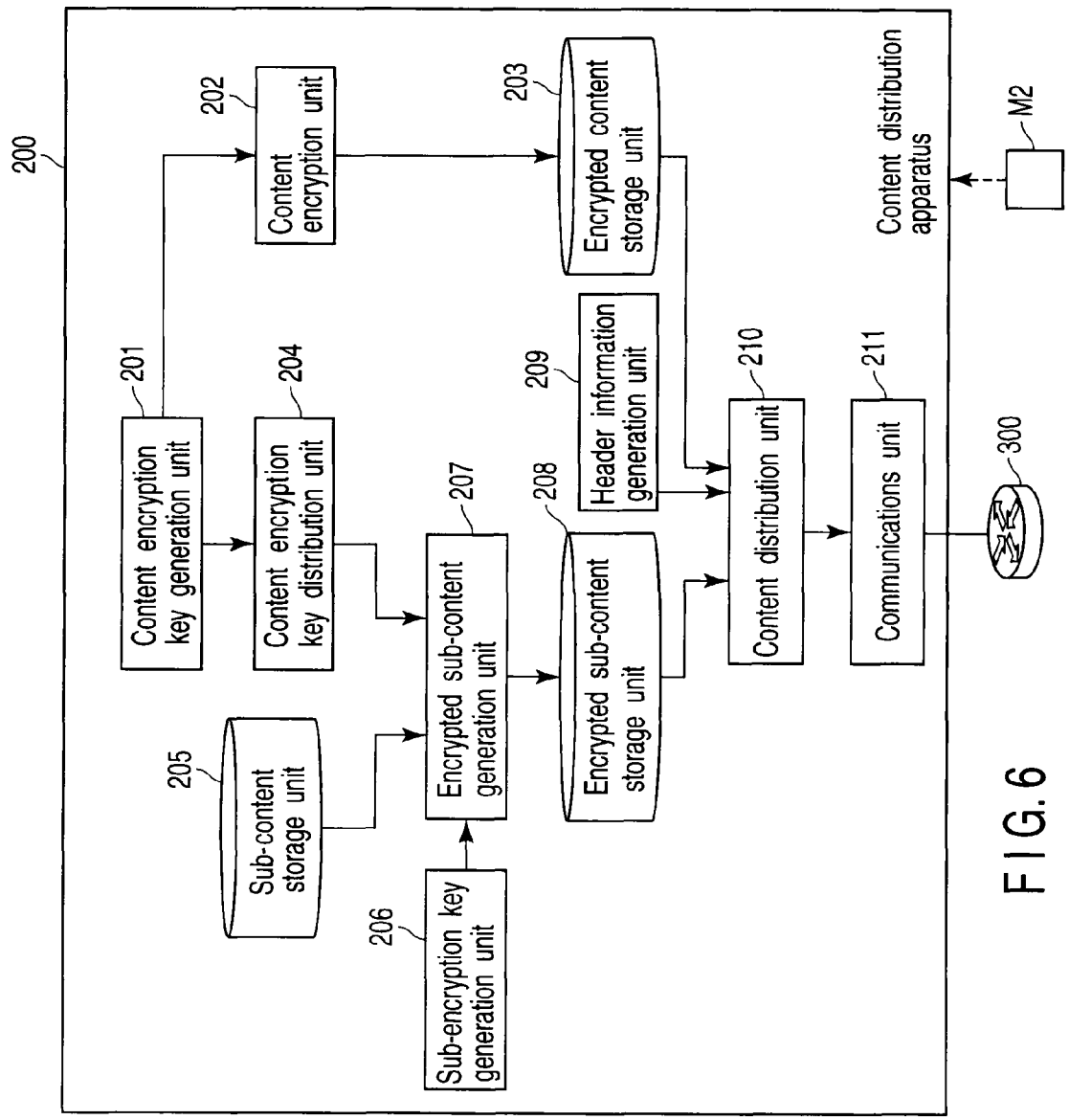
FIG. 6 is a schematic diagram showing the configuration of the content distribution apparatus provided in the first embodiment.

More specifically, the content distribution apparatus 200 comprises, as shown in FIG. 6, a content encryption key generation unit 201, a content encryption unit 202, an encrypted content storage unit 203, a content encryption key distribution unit 204, a sub-content storage unit 205, a sub-encryption key generation unit 206, an encrypted sub-content generation unit 207, an encrypted sub-content storage unit 208, a header information generation unit 209, a content distribution unit 210, and a communications unit 211.

The content encryption key generation unit 201 has the following functions (f201-1) and (f201-2).

(f201-1): To generate content decryption key $K_M$ for encrypting the content the user want to view; and (f201-2): To supply the content decryption key $K_M$ to the content encryption unit 202 and content encryption key distribution unit 204.

In order to enhance the security of the encryption communications system, the content encryption key generation unit 201 may generate a content decryption key $K_M$ for each user apparatus 100, may generate new content decryption keys $K_M$ periodically, or may use different content decryption keys $K_M$ for different content items, respectively. In the case where the content decryption key $K_M$ remains unchanged, the content can be played back even if it has been altered.

The content encryption unit 202 has the following functions (f202-1) and (f202-2).

(f202-1): To encrypt the content item C input externally, based on the content decryption key $K_M$ received from the content encryption key generation unit 201, thereby generating encrypted content item $E(K_M, C)$. Note that the content item C is encrypted by using a common key such as the Advanced Encryption Standard (AES).

(f202-1): To write the encrypted content item $E(K_M, C)$ into the encrypted content storage unit 203.

The encrypted content storage unit 203 is a storage device into which data can be written from the content encryption unit 202, and from which data can be read into the content distribution unit 210. The encrypted content storage unit 203 stores the encrypted content item $E(K_M, C)$.

The content encryption key distribution unit 204 has the following functions (f204-1) and (f204-2).

(f204-1): To perform secret distribution on the content decryption key $K_M$ received from the content encryption key generation unit 201, thereby generating n distribution keys $K_1, \ldots, K_k, \ldots, K_n$, by means of the (k, n) threshold secret sharing scheme using a threshold value k that is equal to or smaller than the number n of sub-content items stored in the sub-content storage unit 205.

(f204-2): To supply n−1 distribution keys, which has been selected from the keys $K_1, \ldots, K_k, \ldots, K_{n-1}$, to the encrypted sub-content generation unit 207.

The secret sharing scheme is, for example, the (k, n) threshold secret sharing scheme, which will be explained below. Assume that the (k, n) threshold secret sharing scheme has distributed original information as n information items. Then, the original information can be restored on the basis of only k information items, where k<n. Nonetheless, this relation of k<n need not be satisfied in the present embodiment by all means. Rather, a secret sharing scheme wherein k=n can be performed in this embodiment. That is, the algorithm of secret distribution is not limited to a particular one. There is a method called the All-or-Nothing Transform that is applicable only when k=n. If the secret sharing scheme is not employed, and if the content decryption key $K_M$ is therefore divided, two problems will arise. First, the data decreases in amount, inevitably reducing the effect of encryption. Second, if the data divided is destroyed during the communication, the decryption key can no longer be restored, rendering it impossible to decrypt the encrypted content. Hence, it is desirable to employ the secret sharing scheme.

The secret distribution will be explained, with reference to a simple example in which a sub-content item SC such as a commercial is divided into three parts (n=3), and the decryption key $K_M$ is subjected to the (2, 3) threshold secret sharing scheme using threshold value 2 and distribution number 3. That is, the encryption key $K_M$ is divided into two encryption keys $K_1$ and $K_2$, which are used to restore the encryption key that has encrypted the content.

First, three sub-content items $SC_1$, $SC_2$ and $SC_3$ are stored in the sub-content storage unit 205. Then, the content encryption key distribution unit 204 performs the (2, 3) threshold secret sharing scheme on the decryption key $K_M$, generating distribution keys $K_1$, $K_2$ and $K_3$. In the example described below, the distribution keys $K_1$, $K_2$ and $K_3$ are used to restore the encryption key.

[Secret Distribution of the Encryption Key $K_M$]

In preparation for the secret distribution, the threshold value k is set to 2, and the distribution number n is set to 3.

Assume that the decryption key $K_M$ should be kept in secret. The Shamir's scheme is utilized, formulating the following one-dimensional polynomial equations $f(x)=ax+K_M$ (mod p).

$$f(1)=a+K_M(\mathrm{mod}\,p)$$

$$f(2)=2a+K_M(\mathrm{mod}\,p)$$

$$f(3)=3a+K_M(\mathrm{mod}\,p)$$

where (mod p) is the remainder obtained by dividing the sub-content item SC by p and is a number greater than the decryption key $K_M$ and a.

The content encryption key distribution unit 204 converts f(1), f(2) and f(3), thus formulated, to distribution keys $K_1$, $K_2$ and $K_3$. The distribution keys $K_1$, $K_2$ and $K_3$ are supplied to the encrypted sub-content generation unit 207.

In this case, if the distribution keys $K_1$ and $K_2$ a, i.e., two of the three distribution keys $K_1, \ldots, K_3$, are acquired, the content encryption key restoration unit 114 can restore the original encryption key $K_M$, as will be explained below.

[Restoration of the Encryption Key $K_M$]

Assume that the encryption key $K_M$ is restored by means of the (k, n) secret sharing scheme, which is described in Shamir et al., "How to share a secret." In the user apparatus 100, the content encryption key restoration unit 114 reads two distribution keys $K_1$ and $K_2$ from the distribution key storage unit 109. The content encryption key restoration unit 114 performs the secret sharing scheme, restoring the encryption key $K_M$, as follows:

$$K_1 = f(1) = a + K_M \pmod{p}$$

$$K_2 = f(1) = 2a + K_M \pmod{p}$$

In this case, a simultaneous equation involving two subequations is solved, obtaining the encryption key $K_M$. Thus explained is the secret sharing scheme performed in the present embodiment.

The sub-content storage unit 205 is a storage device into which data can be read from outside the content distribution apparatus 200 and from which data can be read into the encrypted sub-content generation unit 207. It stores n sub-content items $SC_1, \ldots, SC_n$ that can be played back before the content item C is played back. The n sub-content items $SC_1, \ldots, SC_n$ have beforehand been externally. Instead, the content distribution apparatus 200 may have a sub-content diving unit that divides an externally input sub-content item SC into n sub-content items $SC_1, \ldots, SC_n$. The sub-content items $SC_1, \ldots, SC_n$, thus acquired, may be written into the sub-content storage unit 205. If the sub-content items $SC_1, \ldots, SC_n$ are written into the sub-content storage unit 205, they can be rearranged in any order in the unit 205. On the other hand, if an externally input sub-content item SC is divided into n sub-content items $SC_1, \ldots, SC_n$, the sub-content items $SC_1, \ldots, SC_n$ cannot be rearranged at all.

The sub-encryption key generation unit 206 has the function of generating sub-content encryption keys $K_{SC}$ and the function of supplying the sub-content encryption keys $K_{SC}$ to the encrypted sub-content generation unit 207.

The encrypted sub-content generation unit 207 has the following functions (f207-1) to (f207-3).

(f207-1): To concatenate the distribution keys $K_1, \ldots, K_{n-1}$ received from the content encryption key distribution unit 204, to the sub-content items $SC_2, \ldots, CS_n$ stored in the sub-content storage unit 205, thereby generating n−1 concatenated data items $K_1//SC_2, \ldots, K_{n-1}//CS_n$.

(f207-1): To encrypt n−1 concatenated, one by one, based on the sub-content encryption keys $K_{SC}$, thereby generating n−1 sub-content items $E(K_{SC}, K_1//SC_2), \ldots, E(K_{SC}, K_{n-1}//SC_n)$.

(f207-2): To encrypt the n−1 concatenated data items $K_1//SC_2, \ldots, K_{n-1}//CS_n$, one by one, based on the sub-content encryption key $K_{SC}$, thereby generating n−1 encrypted sub-content items $E(K_{SC}, K_1//SC_2), \ldots, E(K_{SC}, K_{n-1}//SC_n)$.

(f207-3): To write the first sub-content item $SC_1$, the first encryption key $K_{SC}$, and the n−1 sub-content items generated, into the encrypted sub-content storage unit 208.

The encrypted sub-content storage unit 208 is a storage device into which data can be written from the encrypted sub-content generation unit 207, and from which data can be read into the content distribution unit 210. It stores the first sub-content item $SC_1$, the sub-content encryption key $K_{SC}$, and the n−1 sub-content items $E(K_{SC}, K_1//SC_2), \ldots, E(K_{SC}, K_{n-1}//SC_n)$.

The header information generation unit 209 has the function of generating header information that includes a content ID, title information, number of distribution keys, and a thresh value, and the function of supplying the header information to the content distribution unit 210. Note that the content ID and title information identify the content item C input to the content encryption unit 202, the number of distribution keys is n−1, and the thresh value is the number of distribution keys $K_i$ that can restore the encryption key $K_M$.

The content distribution unit 210 has the following functions (f210-1) and (f210-2).

(f210-1): To stream-distribute, in response to the user's request, the header information received from the header information generation unit 209, the reference sub-content ($SC_1$, $K_{SC}$) composed of the first sub-content item $SC_1$ and first encryption key $K_{SC}$, both stored in the encrypted sub-content storage unit 208, and the n−1 sub-content items $E(K_{SC}, K_1//SC_2), \ldots, E(K_{SC}, K_{n-1}//SC_n)$, from the communications unit 211 to the user apparatus 100. The encryption key $K_{SC}$ may be embedded, as electronic watermark, in the sub-content item $SC_1$. If this is the case, an illegal extraction of the encryption key $K_{SC}$ can be more reliably prevented than in the case where the encryption key $K_{SC}$ is concatenated to the sub-content item $SC_1$. This helps to enhance the security.

(f210-2): To stream-distribute the encrypted content item $E(K_M, C)$ stored in the encrypted content storage unit 203 from the communications unit 211 to the user apparatus 100, upon stream-distributing the encrypted sub-content.

The communications unit 211 has the function of serving as a communications interface between the content distribution apparatus 200 and the network 300.

The operation sequence of the encryption communications system so configured as described above will be explained with reference to the sequence diagram of FIG. 7.

(Preparation)

In the content distribution apparatus 200, the content encryption key generation unit 201 generates encryption key $K_M$ for encrypting the content that the user wants to view. The encryption key $K_M$ is supplied to the content encryption unit 202 and content encryption key distribution unit 204.

Based on the encryption key $K_M$, the content encryption unit 202 encrypts the content item C externally input, providing encrypted content item $E(K_M, C)$. The encrypted content item $E(K_M, C)$ is written into the encrypted content storage unit 203.

Meanwhile, n sub-content items $SC_1, \ldots, SC_n$, which should be played back before the content item C, are externally written into the sub-content storage unit 205.

The encryption key distribution unit 204 performs the (k, n) secret distribution on the encryption key $K_M$ received from the content encryption key generation unit 201, using, as threshold value, value k equal to or smaller than the number n of sub-content items stored in the sub-content storage unit 205. Performing the (k, n) secret distribution, the encryption key distribution unit 204 generates n distribution keys $K_1, \ldots, K_k, \ldots, K_n$. Of these distribution keys, n−1 distribution keys $K_1, \ldots, K_{n-1}$ are supplied to the encrypted sub-content generation unit 207.

The sub-encryption key generation unit 206 generates encryption key $K_{SC}$. The encryption key $K_{SC}$ is supplied to the encrypted sub-content generation unit 207.

The encrypted sub-content generation unit 207 concatenates the n−1 distribution keys $K_1, \ldots, K_{n-1}$ received from the encryption key distribution unit 204, to the n−1 sub-content items $SC_2, \ldots, SC_n$ stored in the sub-content storage unit 205, thereby generating n−1 concatenated n−1 concatenated data items $K_1//SC_2, \ldots, K_{n-1}//CS_n$.

Thereafter, based on the encryption key $K_{SC}$, the encrypted sub-content generation unit 207 encrypts the n−1 sub-content items $E(K_{SC}, K_1//SC_2), \ldots, E(K_{SC}, K_{n-1}//SC_n)$, one by one, generating n−1 encrypted sub-content items $E(K_{SC}, K_1//$ $SC_2$), ..., $E(K_{SC}, K_{n-1}//SC_n)$. The first sub-content item $SC_1$, the first encryption key $K_{SC}$, and the n−1 encrypted sub-content items are written into the encrypted sub-content storage unit 208.

The header information generation unit 209 generates and holds header information that includes a content ID, title information, number of distribution keys, and a thresh value, all having been externally input.

Thus, the content distribution apparatus 200 is prepared to accomplish stream distribution.

(Playback During the Stream Distribution)

Next, the user operates the user apparatus 100, causing the content requesting/receiving unit 102 to transmit, to the content distribution apparatus 200, a content request that includes the content ID of the content the user wants to view.

In the content distribution apparatus 200, the content distribution unit 210 transmits, in accordance with the content ID included in the content request, the header information generated by the header information generation unit 209 and the reference sub-content ($SC_1$, $K_{SC}$) composed of the first sub-content item $SC_1$ and first encryption key $K_{SC}$, both stored in the encrypted sub-content storage unit 208, to the user apparatus 100 (ST1).

In the user apparatus 100, the content requesting/receiving unit 102 supplies the number of distribution keys and the threshold value, both included in the header information, to the distribution key management unit 113. Further, the content requesting/receiving unit 102 writes the header information and the reference sub-content ($SC_1$, $K_{SC}$) into the content storage unit 103 (ST2).

The content playback unit 104 reads the header information and reference sub-content ($SC_1$, $K_{SC}$) now stored in the content storage unit 103. The content playback unit 104 then supplies the sub-content item $SC_1$ to the display unit 105 and writes the sub-content encryption key $K_{SC}$ into the encryption key storage unit 106. The display unit 105 plays back the sub-content item $SC_1$ in the form of an image or sound.

Next, the content distribution apparatus 200 transmits the first encrypted sub-content item $E(K_{SC}, K_1//SC_2)$ to the user apparatus 100 (ST3).

In the user apparatus 100, the content requesting/receiving unit 102 writes this encrypted sub-content item $E(K_{SC}, K_1//SC_2)$ into the content storage unit 103.

Based on the sub-content encryption key $K_{SC}$ now stored in the encryption key storage unit 106, the encrypted content decryption unit 107 decrypts the encrypted sub-content item $E(K_{SC}, K_1//SC_2)$ stored in the content storage unit 103, generating concatenated data item $K_1//SC_2$. The concatenated data item $K_1//SC_2$ is supplied to the content playback unit 104. The content storage unit 103 supplies the sub-content item $SC_2$, which is included in the concatenated data item $K_1//SC_2$, to the display unit 105. The display unit 105 plays back the sub-content item $SC_2$ in the form of an image or sound.

At this point, the distribution key extraction unit 108 extracts the distribution key $K_1$ from the concatenated data item $K_1//SC_2$ and writes the distribution key $K_1$ into the distribution key storage unit 109. The distribution key counting unit 110 counts the distribution keys stored in the distribution key storage unit 109 while the distribution key extraction unit 108 is operating. The number of the distribution keys counted is written into the content playback information that is stored in the content playback information storage unit 111. The playback state monitoring unit 112 compares the threshold value and the number of distribution keys, both read from the distribution key management unit 113, thereby monitoring the state in which the content playback unit 104 is playing back the sub-content item $SC_2$.

The processes described above are repeated for the second sub-content item to the (n−2)th sub-content item.

Then, the content distribution apparatus 200 transmits the (n−1)th encrypted sub-content item $E(K_{SC}, K_{1-1}//SC_n)$ to the user apparatus 100 (ST5).

In the user apparatus 100, the content requesting/receiving unit 102 writes this encrypted sub-content item $E(K_{SC}, K_{1-1}//SC_n)$ into the content storage unit 103.

Based on the sub-content encryption key $K_{SC}$ now stored in the encryption key storage unit 106, the encrypted content decryption unit 107 decrypts the encrypted sub-content item $E(K_{SC}, K_{1-1}//SC_n)$ stored in the content storage unit 103, generating concatenated data item $K_{n-1}//SC_n$. The concatenated data item $K_{n-1}//SC_n$ is supplied to the content playback unit 104. The content storage unit 103 supplies the sub-content item $SC_n$, which is included in the concatenated data item data item $K_{n-1}//SC_n$, to the display unit 105. The display unit 105 plays back the sub-content item $SC_n$ in the form of an image or sound.

At this point, the distribution key extraction unit 108 extracts the distribution key $K_1$ from the concatenated data item $K_{n-1}//SC_n$ and writes the distribution key $K_{n-1}$ into the distribution key storage unit 109. The distribution key counting unit 110 counts the n−1 distribution keys stored in the distribution key storage unit 109 while the distribution key extraction unit 108 is operating. The number of the distribution keys counted is written into the content playback information that is stored in the content playback information storage unit 111. The playback state monitoring unit 112 compares the threshold value and the number of distribution keys, both read from the distribution key management unit 113, thereby monitoring the state in which the content playback unit 104 is playing back the sub-content item $SC_n$.

Thereafter, the content encryption key restoration unit 114 restores the encryption key $K_M$, on the basis of the distribution keys $K_1, \ldots, K_{n-1}$ stored in the distribution key storage unit 109. The encryption key $K_M$ thus restored is written into the encryption key storage unit 106.

Finally, the content distribution apparatus 200 transmits the encrypted main-content $E(K_M, //C)$ to the user apparatus 100 (ST7).

In the user apparatus 100, the content requesting/receiving unit 102 writes this encrypted content item $E(K_M, //C)$ into the content storage unit 103 (ST8).

Based on the sub-content encryption key $K_M$ stored in the encryption key storage unit 106, the encrypted content decryption unit 107 decrypts the encrypted content item $E(K_M, //C)$ now stored in the content storage unit 103, generating content item C. The content item C thus generated is supplied to the content playback unit 104.

The content playback unit 104 supplies the content item C to the display unit 105. The display unit 105 plays back the content item C in the form of an image or sound.

While the display unit 105 is playing back the sub-content item SC or content item C, the user may operate the user apparatus 100 to interrupt the playback of the sub-content or content item C. In this case, the content playback unit 104 updates the content playback information stored in the content playback information storage unit 111. The process is thereby terminated.

(Resuming of the Playback)

Assume that the user operates the user apparatus 100 to resume the playback. Then, the content playback unit 104 outputs inquiry information to the display unit 105, based on the playback start time information stored in the content playback information storage unit 111. The display unit 105 displays the inquiry, i.e., whether the user wants to resume the playback at that part of the sub-content or main-content, where the playback has been interrupted. Thus, the display unit 105 prompts the user to input response information.

Thereafter, the content playback unit 104 plays back the sub-content or content, starting at the part where the playback has been interrupted, if the response information the user has input is affirmative, or plays back the sub-content or content from the beginning if the response information is negative.

Assume that the user has interrupted the playback of the sub-content item $SC_i$. Then, in accordance with the response information, the content playback unit 104 refers to the playback part information and the playback start time information, both stored in the content playback information storage unit 111. The content playback unit 104 then playbacks the sub-content item $SC_i$, starting at the part where the playback has been interrupted, or from the very beginning. Assume that the user has interrupted the content item C. In this case, the content playback unit 104 playbacks the first sub-content item $SC_1$ et seq., acquiring the distribution key again.

Figure 8:
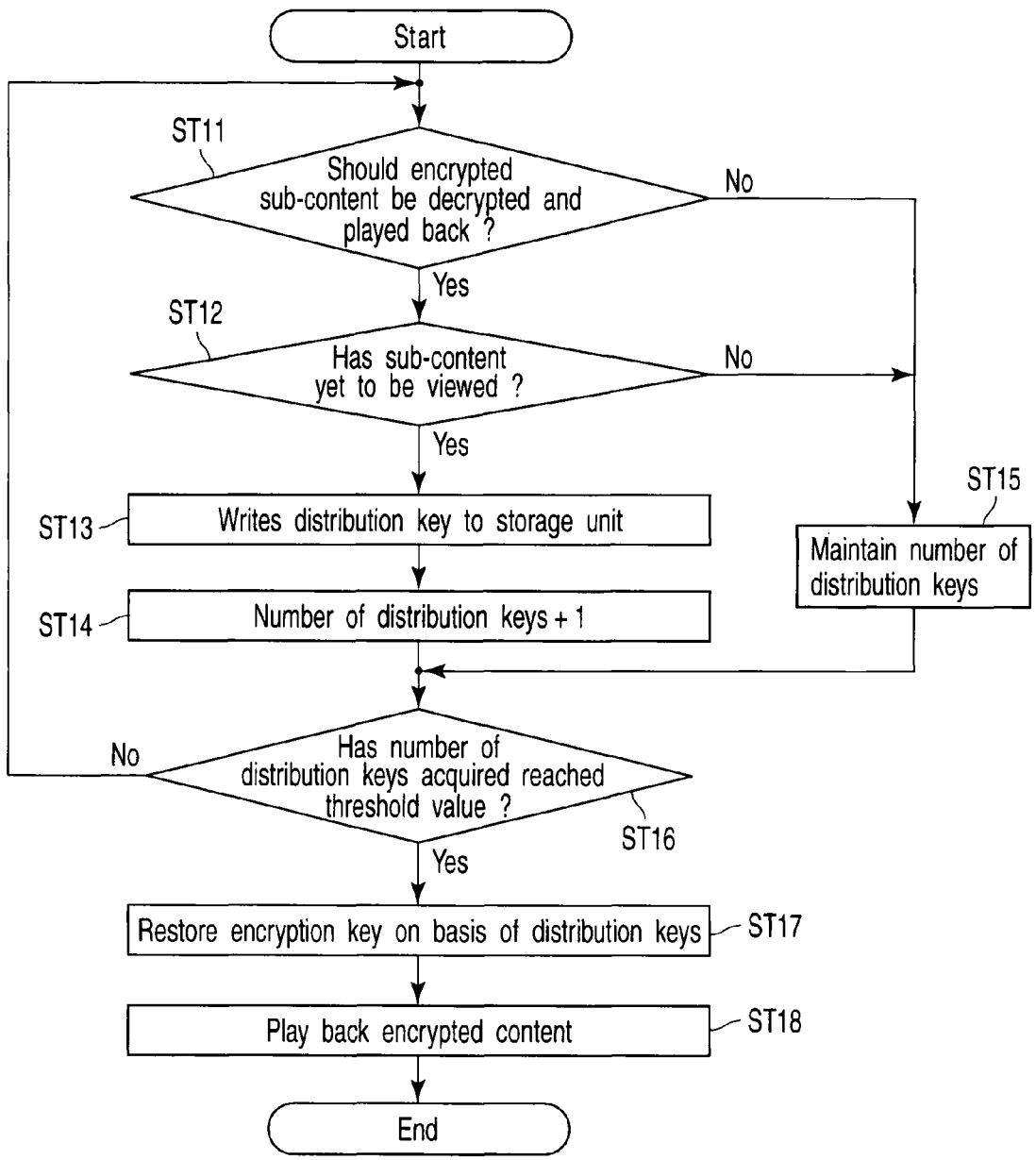
FIG. 8 is a flowchart explaining the operation the first embodiment performs.

In the user apparatus 100, the content playback unit 104 determines whether the sub-content has yet to be viewed (ST12) if an encrypted sub-content should be decrypted and played back (if Yes in ST11) as shown in FIG. 8. The unit 104 can make this decision in two alternative methods. In the first method, the distribution key contained in the concatenated data item decrypted is compared with the distribution key stored in the distribution key storage unit 109. If the distribution keys compared are not identical, it is determined that the sub-content has not been viewed. In the second method, the ID of the sub-content already viewed, which has been saved, is compared with the ID of the sub-content included in the concatenated data item decrypted this time. If the sub-content IDs compared are not identical, it is determined that the sub-content has not been viewed.

If it is determined that the sub-content has yet to be viewed, in either method (if Yes in ST12), the distribution key extraction unit 108 writes the distribution key into the distribution key storage unit 109 (ST13). Then, the distribution key counting unit 110 updates the number of distribution keys stored in the content playback information storage unit 111, by "+1" (ST14). That is, the unit 110 increases the number by one.

At this point, the playback state monitoring unit 112 compares the threshold value and the number of distribution keys, both read from the distribution key management unit 113, thereby monitoring the state in which the content playback unit 104 is playing back the sub-content items $SC_2, \ldots, SC_n$.

If the playback state monitoring unit 112 detects that the number of distribution keys acquired is smaller than the threshold value and that the playback state is either fast forwarding or skipping, it outputs a warning or inquiry information to the display unit 105. The warning indicates that content item C cannot be played back, and the inquiry information asks the user whether the playback state should be returned to one before the fast forwarding or the skipping is performed.

Thereafter, when the user inputs, in replay to the warding or the inquiry information, the response information that shows the playback state should be returned to one before the fast forwarding or the skipping is performed, the playback state monitoring unit 112 corrects the position where the content playback unit 104 has played back the sub-content, before the fast forwarding or the skipping is performed. Then, the playback state monitoring unit 112 controls the content playback unit 104, causing the same to play back the content.

If the user inputs negative response information, ignoring the warning, the playback state monitoring unit 112 makes the distribution key management unit 113 erase, from the distribution key storage unit 109, the distribution key $K_i$ that has been acquired in the fast-forwarding state or the skipping state. After the user operates the user apparatus 100, stopping the fast-forwarding state or the skipping state, the user apparatus 100 may not return to the fast-forwarding state or the skipping state and may, instead, play back the sub-content to acquire a distribution key. The distribution key acquired by playing back the sub-content will no be erased.

If it is determined that not the encrypted sub-content, but the reference sub-content should be decrypted (if No in ST11), or it the sub-content has already been viewed (if No in ST12), the distribution keys stored in the distribution key storage unit 109 will not increase in number. Therefore, the distribution key counting unit 110 does not update the number of distribution keys (ST15).

After Step S14 or Step S15 has been performed, the content playback unit 104 of the user apparatus 100 determines whether the number of distribution keys acquired has reached the threshold value (ST16). If the number of distribution keys acquired has not reached the threshold value, the process returns to Step ST11.

On the other hand, if is determined in Step ST16 that the number of distribution keys acquired has reached the threshold value, the content playback unit 104 supplies the data representing this fact, to the display unit 105. The display unit 105 displays a message showing that the number of distribution keys acquired has reached the threshold value. Meanwhile, the content encryption key restoration unit 114 restores the encryption key $K_M$, on the basis of the distribution keys $K_1, \ldots$ available in number corresponding to the threshold value (ST17).

Based on the encryption key $K_M$, the encrypted content decryption unit 107 decrypts the encrypted content item $E(K_M, C)$, generating content item C. The content item C thus generated is supplied to the content playback unit 104.

Thereafter, the content playback unit 104 plays back the content item C, starting at the part where the playback of the content item C has been interrupted, if the response information received first is affirmative, or plays back the content item C from the beginning if the response information received first is negative. While the content item C is being played back, either the fast forwarding or the skipping can be performed.

As has been described, the present embodiment is so configured that the distribution keys $K_1, \ldots$, which are available in number corresponding to the threshold value and which can therefore serve to restore the content encryption key $K_M$, cannot be acquired unless as many sub-content items $SC_i$ as the threshold value are played back after the sub-content item $SC_1$ has been played back. In addition, the present embodiment is configured to monitor the state in which the sub-content items are being played back, and to erase the distribution keys $K_i$ acquired in the fast-forwarding state or the skipping state, if the user ignores the warning, not returning the playback state to one before the fast forwarding or the skipping. This prevents any main-program from being played back unless sub-content items such as commercials are played back first.

For example, a main-content may be distributed via the network or saved in the user apparatus 100. In this case, the user who has interrupted the playback of the content after viewing a part of the content cannot play back the remaining part of the content unless he or she play backs and views a sub-content that is not related to the main-content.

If the user wants to view the content item C immediately, he or she may first playback as many sub-content items as the threshold value, in the fast-forwarding state or the skipping state. Then, the user can acquire as many distribution keys as the threshold value and can therefore view the content item C.

The present embodiment may be modified as follows. That is, such content playback information as shown in FIG. 9 may be used in place of the content playback information described above. The information shown in FIG. 9 specifies any sub-content items that have been played back.

This content playback information includes content IDs, playback part information items, numbers of distribution keys acquired, played-back sub-content information (ID) items, and playback start time information items. The content IDs are of the type that has been described above. Each playback part information item is either "0" indicating that a sub-content item $SC_i$ has been played back, or "1" indicating that a content item C has been played back. The playback part information item remains "1," never reset to "0," once the content item C has been played back.

Each number of distribution keys acquired indicates the number of distribution keys that have been acquired while sub-content item $SC_i$ is being played back. It is reset to "0" at the start of playing back the content item C.

Each played-back sub-content information (ID) item is a bit train, each bit representing a sub-content item played back if it is "1," and a sub-content item not played back yet if it is "0." As shown in FIG. 10, in each played-back sub-content information item, the most significant bit indicates the first encrypted sub-content item, the bit next to the most significant indicates the second encrypted sub-content item, and so forth. And the least significant bit indicates the (n−1)th encrypted sub-content item.

Each playback start time information item indicates the playback start time of a content item C, not that of a sub-content item.

Hence, the content playback unit 104 has two functions. The first function is to write the sub-content information items, each indicating a sub-content item already played back, into the content playback information storage unit 111. The first function is performed, in place of the above-described function of recording the playback start time of each sub-content item and the above-described function of playing back the sub-content item, at the playback start time recorded. The second function is to erase the played-back sub-content information items stored in the content playback information storage unit 111 when the playback of the content item C is started.

The playback state monitoring unit 112 has the function of referring to the information stored in the content playback information storage unit 111, in order to play back the sub-content items. The unit 112 has another function of outputting neither the above-mentioned warning nor the inquiry information (asking whether the playback state should return to one before the fast-forwarding state or the skipping state) even if the number of distribution keys acquired does not reach the threshold value, in the case where the information referred to shows that the sub-content items have all been played back.

Figure 11:
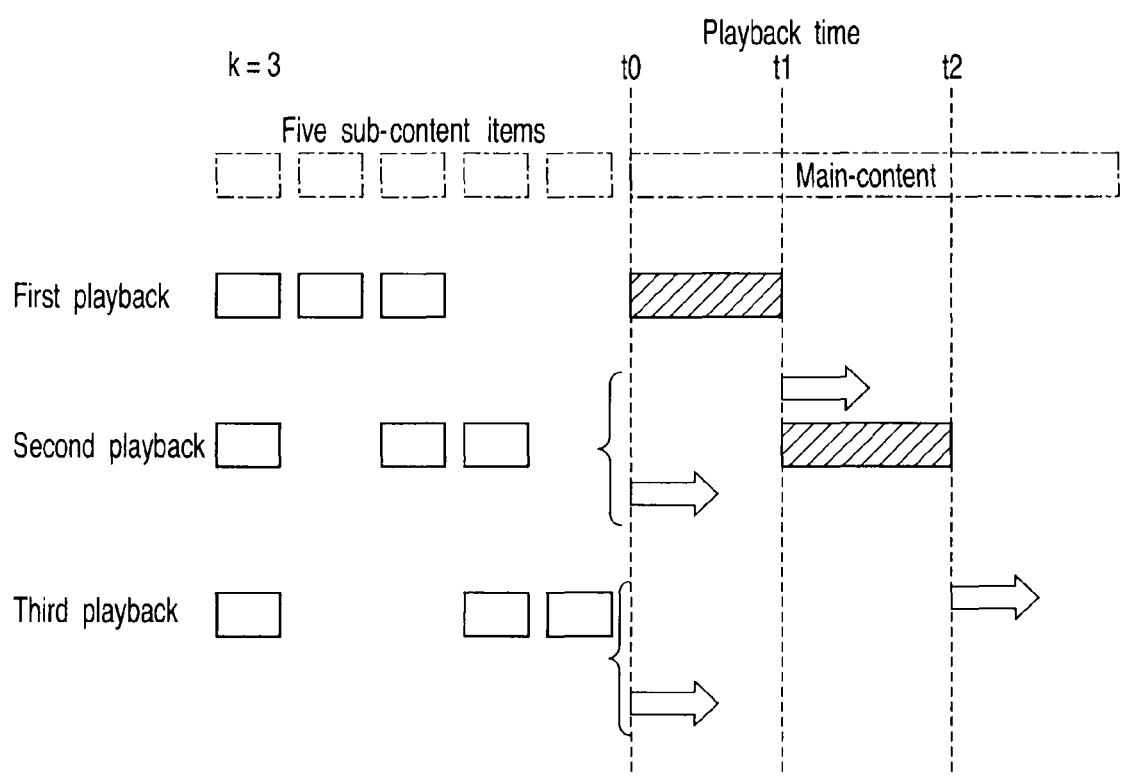
FIG. 11 is a schematic diagram explaining the operation the modified embodiment performs.

In the embodiment thus modified as explained above, the sub-content items played back and the number of distribution keys acquired are known. Therefore, any sub-content item not played back yet can be immediately played back, by fast forwarding or skipping the sub-content items played back. Further, since the playback start time of the content item C is known in the modified embodiment, the content item C can be played back from the beginning (at time $t_0$) or at playback start time ($t_1$) if its playback has interrupted at time $t_1$, as shown in FIG. 11, after as many sub-content items as the threshold value have been played back. Similarly, the content item C can be played back from the beginning (at time $t_0$) or at playback start time ($t_2$) if its playback has interrupted at time $t_2$.

Second Embodiment

Figure 12:
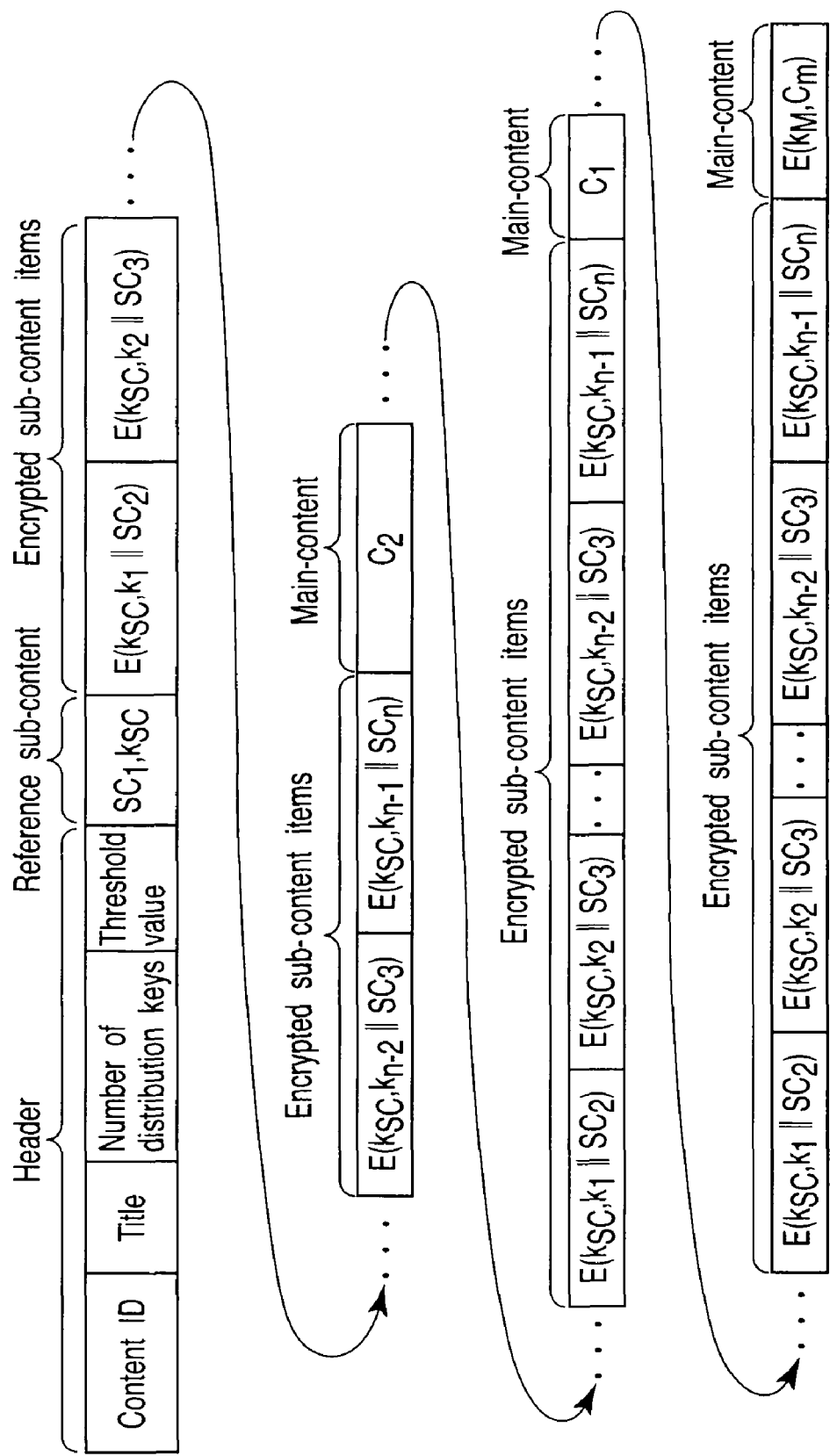
FIG. 12 is a schematic diagram representing the structure of data to be stream-distributed in a content distribution/presenting system according to a second embodiment of this invention.

FIG. 12 is a schematic diagram representing the structure of data to be stream-distributed in a content distribution/presenting system according to a second embodiment of this invention. The components identical to those of the first embodiment, already described with reference to FIGS. 1 to 11, are designated by the same reference numbers and will not be described in detail. Only the components different from those described will be described in the main. In describing any other embodiment of the invention, the components identical to those of the first embodiment will not be described, either.

In the first embodiment, the main-content is played back after all sub-content items have been played back. The present embodiment differs from the first embodiment in that sub-content items, such as commercials, are inserted at intervals in the main-content.

Sub-content items such as commercials are inserted in this way in, for example, a television broadcast. In the terrestrial digital TV broadcast that will come into service in 2011, replacing the existing TV broadcasting system, each program broadcast can be copied only once. The commercial video data items included in the copied program may be skipped.

In view of this, the present embodiment is designed to prevent the skipping of commercials in such a copied TV program. The basic function-block configuration of the system according to the present embodiment is similar to that of the first embodiment. The system of this embodiment differs in the structure of the data that should be stream distributed.

As FIG. 12 shows, the data to be stream distributed comprises header information and reference sub-content ($SC_1$, $K_{SC}$). The data further comprises various data items that are arranged after the reference sub-content ($SC_1$, $K_{SC}$). They are: n−1 encrypted sub-content items $E(K_{SC}, K_1//SC_2), \ldots, E(K_{SC}, K_{n-1}//SC_n)$, first content item $C_1$, n−1 encrypted sub-content items $E(K_{SC}, K_1//SC_2), \ldots, E(K_{SC}, K_{n-1}//SC_n)$, second content item $C_2$, n−1 encrypted sub-content items $E(K_{SC}, K_1//SC_2), \ldots, E(K_{SC}, K_{n-1}//SC_n)$, (m−1)th content item $C_{m-1}$, n−1 encrypted sub-content items $E(K_{SC}, K_1//SC_2), \ldots, E(K_{SC}, K_{n-1}//SC_n)$, and encrypted content item $E(K_M, C_m)$. The m content items $C_1, \ldots, C_m$ have been obtained by dividing main-content C into m segments. Of the m content items $C_1, \ldots, C_m$, only the mth main-content has been encrypted.

In the user apparatus 100, of the m×n−1 encrypted sub-content items $E(K_{SC}, K1//SC_2), \ldots, E(K_{SC}, K_{n-1}//SC_n)$, those as many as the threshold value may be viewed and as many distribution keys $K_i$ as the threshold value may thereby be acquired. Then, the encrypted content item $E(K_M, C_m)$ can be decrypted and viewed by restoring the content encryption key $K_M$.

As shown in FIG. 13, each group SC#i of n−1 encrypted sub-content items, which precedes the content items $C_1, \ldots, C_m$, and the encrypted content items $E(K_M, C_m)$, may be a first key arrangement that includes n−1 distribution keys $K_1, \ldots, K_{n-1}$. Alternatively, the group SC#i of n−1 may be a second key arrangement that includes one distribution key $K_i$.

Such stream-distributed data as described above is stored into the content storage unit 103.

The content playback unit 104 has a function in addition to those functions explained in conjunction with the first embodiment and the modification thereof. This function of the unit 104 is to acquire the number m (not shown) by which to divide the content item C into segments, from the header information stored in, for example, the content storage unit 103, to play back the first content item $C_1$ to the (m−1)th content item $C_{m-1}$ based on the number m, without decrypting them in the same way as the reference sub-content item $SC_1$, and to play back the content item $C_m$ obtained by decrypting only the mth encrypted content item $E(K_M, C_m)$ in the content decryption unit 107.

So configured as described above, the present embodiment can operate in the same way as the first embodiment, achieving the same advantages as the first embodiment, even if the data to be stream distributed has such a repeated structure that the main-content item $C_m$ cannot be played back unless as many sub-content items as the threshold value are played back as in the TV broadcasting.

Further, in the present embodiment, the sub-content items $SC_1, \ldots, SC_n$, such as commercial video data items, which should be viewed in order to view the encrypted program content item $C_m$, can hardly be skipped if the threshold value is large.

Third Embodiment

Figure 14:
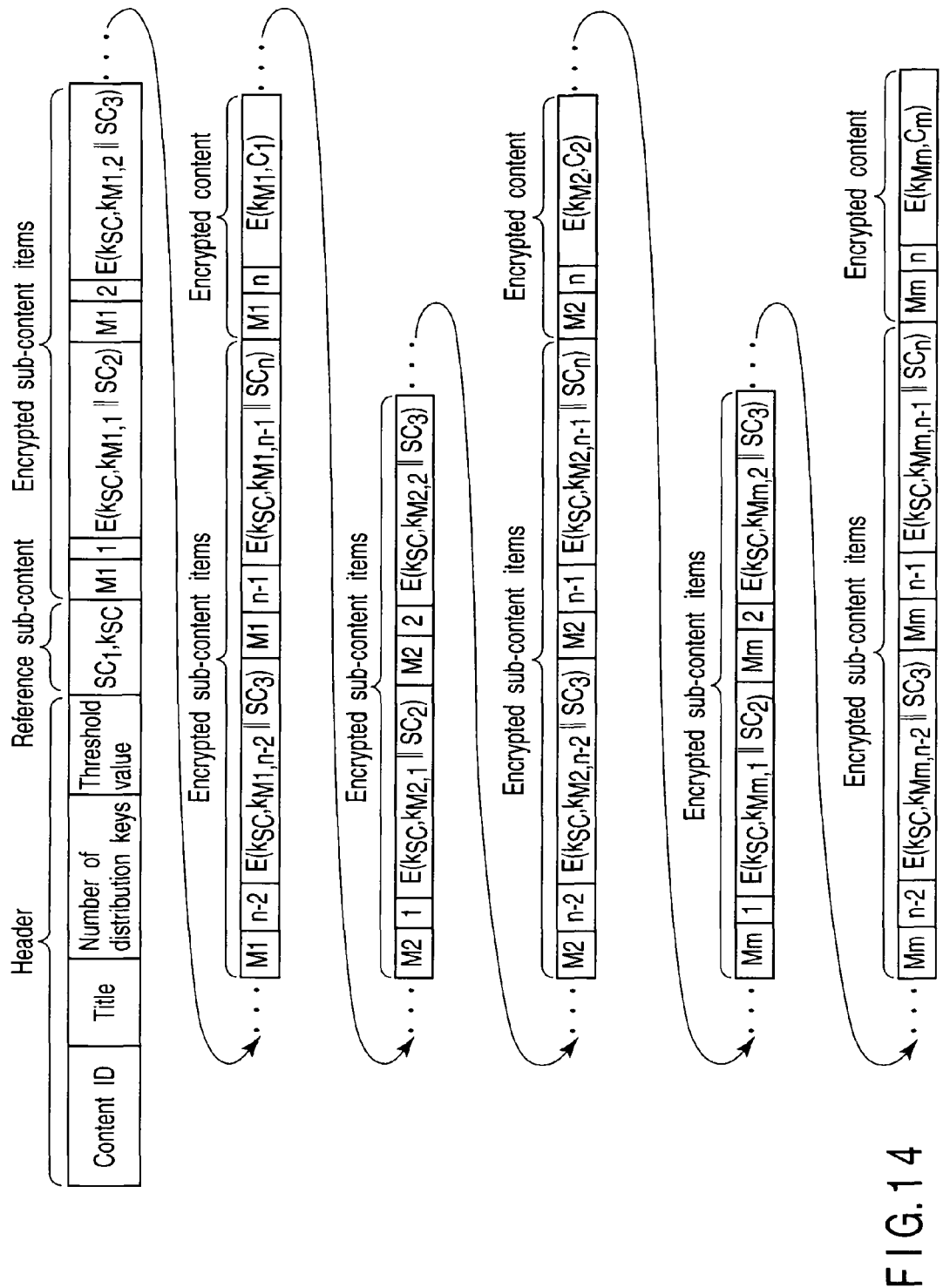
FIG. 14 is a schematic diagram representing the structure of data to be stream-distributed in a content distribution/representing system according to a third embodiment of the present invention.

FIG. 14 is a schematic diagram representing the structure of data to be stream distributed in a content distribution/representing system according to a third embodiment of the present invention.

In the present embodiment, commercial video data items are inserted between the segments of a main-content as in a TV broadcast program, in the same manner as in the second embodiment. The segments of the content, i.e., main-content items $C_i$ ($1 \leq i \leq m$), are encrypted with different encryption keys $K_{Mi}$ (($1 \leq i \leq m$).

As FIG. 14 shows, the data to be stream distributed comprises header information and reference sub-content ($SC_1$, $K_{SC}$). The data further comprises various data items that are arranged after the reference sub-content ($SC_1$, $K_{SC}$). They are: content ID information "M1," order information "1," encrypted sub-content items $E(K_{SC}, K_{1,1}//SC_2), \ldots$, content ID information "M1," order information "n−1," an encrypted sub-content item $E(K_{M1, n-1}//SC_n)$, content ID information "M1," order information "n," and an encrypted content item $E(K_{Mi}, C_1)$.

The header information includes a content ID, title information, and the threshold value, i.e., the number of distribution keys required for playing back each main-content item $C_i$ ($1 \leq i \leq m$). Threshold values, each defining the number of content distribution keys $K_{Mi}, j, \ldots$ required for playing back one main-content item $C_i$ ($1 \leq i \leq m$), may differ from each other. In this case, it suffices to record the threshold value for the ith ($1 \leq i \leq m$) content item $C_i$ in the header information.

The encrypted content item $E(K_M, C_1)$ is followed by various data items about the second main-content item, i.e., content ID information "M2," order information "1," encrypted sub-content items $E(K_{SC}, K_{M2,1}//SC_2), \ldots$, content ID information "M2," order information "n−1," encrypted sub-content items $E(K_{SC}, K_{M2,n-1}//SC_n)$, content ID information "M2," order information "n," and an encrypted content item $E(K_{Mi}, C_2)$.

Similarly, various data items about any other main-content follow the last data item of the immediately preceding main-content. And for the last main-content, i.e., mth main-content, content ID information "Mm," order information "1," encrypted sub-content items $E(K_{SC}, K_{Mm,1}//SC_2), \ldots$, content ID information "Mm," order information "n−1," encrypted sub-content items $E(K_{SC}, K_{Mm, n-1}//SC_n), \ldots$, content ID information "Mm," order information "n," and an encrypted content item $E(K_{Mm}, C_m)$.

In the stream-distributed data described above, the content $K_{M1, i}$ ($1 \leq i \leq n-1$) obtained by performing secret distribution on the encryption key $K_M$, and the sub-content item $SC_j$ ($2 \leq j \leq n$) are concatenated to, for example, the content item $E(K_{M1}, C_1)$ obtained by encrypting the first content item $C_1$ with the content encryption key $K_M$. Then, the sub-content items $E(K_{SC}, K_{M1, i}//SC_j)$ ($1 \leq i \leq n-1$, $2 \leq j \leq n$), all encrypted with the encryption key $K_{SC}$, are arranged in sequence. Further, content ID information "Mi" and order information "i" representing that the content is the ith content are arranged before each encrypted sub-content item. The various data items constituting each of the second to mth content items are arranged in a similar manner.

The content ID information "Mi" and the order information "i" render it easy to determine whether any sub-content item has been reviewed before the content preceding it is played back, even if the playback of the main-content is interrupted.

Thus, as shown in FIG. 15, the content playback information stored in the content playback information storage unit 111 includes content ID information "ac0001," playback part information items "M4" (or content ID information "Mi") and "3" (or order information "i"). The content playback information therefore shows that the content whose ID information "ac0001" is the fourth content item, that the third sub-content item has been viewed for 25 seconds, and that two content distribution keys have been acquired for the content encryption key $K_{M4}$.

The content storage unit 103 stores such stream-distribution data as has been described above.

The content playback unit 104 has two other functions. The first other function is to record the playback part information composed of content ID information Mm and order information n, in place of the flag (either 0 or 1) of playback part information. The second other function is to play back a sub-content and a content based on content playback information composed of such playback part information (i.e., content ID information and order information) and the playback start time information. Based on the content playback information, the content playback unit 104 causes the content decryption unit 107 to decrypt the third encrypted sub-content associated with the fourth content item (M4), with the encryption key $K_{SC}$ extracted from the reference sub-content ($SC_1$, $K_{SC}$). The sub-content item $SC_3$, thus decrypted, can be played back for 25 seconds from the playback start time. Moreover, the content playback unit 104 may first play back the first sub-content item associated with the fourth content item (M4), so that the distribution key extraction unit 108 may acquire a distribution key.

Configured as described above, the present embodiment not only can attain the same advantage as the second embodiment, but also can more reliably prevent the user from skipping the sub-content items $SC_1, \ldots, SC_n$, since as many distribution keys $K_i, \ldots$ as the threshold value must be acquired for each main-content item, though the threshold value is just the same as in the second embodiment.

The first to third embodiments have been described on the assumption that content items are moving ones such as movies or TV programs. Nonetheless, they can process still pictures and electronic data such as electronic books, in the same way as moving content items. The first to third embodiments may prohibit the user from read, for example, an electronic book unless he or she reads designated advertising pages associated with the electronic books. In this instance, the parameter for performing secret distribution may be changed, thereby to increase the number of threshold values.

The present embodiment can be modified as will be described below.

The content playback unit 104 may be modified to have two functions. Here, the played-back sub-content information as in the modification of the first embodiment is omitted. The first function is to record the playback part information composed of content ID information $M_m$ and order information n, in place of the flag (either 0 or 1) of playback part information. The second function is to play back the sub-content and the content, based on the content playback information including the playback part information (i.e., content ID information and order information).

In this modified embodiment, the content playback unit 104 causes the content decryption unit 107 to decrypt the third encrypted sub-content associated with the fourth content (M4), with the encryption key $K_{SC}$ extracted from the reference sub-content. The sub-content item $SC_3$, thus decrypted, can be played back from the beginning (from 0th second). (This is because no playback start time is recorded for the sub-content.) The content playback unit 104 may first play back the first sub-content item for the fourth content item M4 as in the third embodiment, so that the distribution key extraction unit 108 may acquire a distribution key.

This modified embodiment can use playback part information that consists of less bits (see FIG. 15) than the played-back sub-content information shown in FIG. 10 (n–1 bits or more, where n–1 is the number of encrypted sub-content items).

The technique described above for the embodiment can be stored as a program to be executed by a computer in memory mediums including magnetic disks (Floppy™ disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the operating system (OS) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

What is claimed is:

1. A user apparatus communicating with a content distribution apparatus, comprising: a storage device storing a threshold value k, sub-content item SC1, an encryption key KSC, n-1 encrypted sub-content items E(KscI, KI//SC2), . . . , E(Ksc, Kn_I//SCn) and an encrypted content item E(KM, Cm), when the content distribution apparatus encrypts a content to view, with a content encryption key KM, thereby generating an encrypted content item E(KM, C), performs the (k, n) threshold secret sharing scheme on the content decryption key KM, using the threshold value k that is equal to or smaller than the number n of sub-content items SCI, . . . , SCn able to be played back before the content item C is played back, thereby generating n distribution keys KI, . . . , Kn_I, Kn (where 3~n) and a sub-content encryption key KSC, concatenates the n-i distribution keys KI, . . . , Kn_1 included in the n distribution keys to the n-i sub-content items SC2, . . . , SCn included in the n sub-content items, respectively, thereby generating n-1 concatenated data items KI//SC2, . . . , Kn_I//SCn, encrypts the n-1 concatenated data items KI//SC2, . . . , Kn_I//SCn, one by one, based on the sub-content encryption key KSC, thereby generating n-1 encrypted sub-content items E(Ksc, KI//SC2), . . . , E(Ksc, Kn_I//SCn), and distributes one sub-content not included in the concatenated data items, the sub-content encryption key KSC, the n-i encrypted sub-content items E(Ksc, KI//SC2), . . . , E(Ksc, Kn_I//SCn) and the encrypted content item E(KM, C), one after another; a first decryption device decrypting the encrypted sub-content items E(Ksc, KI//SC2), . . . , one after another, based on the sub-content encryption key KSC stored in the storage device, thereby generating the concatenated data items KI//SC2, . . . ; a first playback device playing back, one after another, the first sub-content item SC1 stored in the storage device and stored sub-content items SC2, . . . included in the concatenated data items generated by the first decryption device; a distribution key storage device storing, one after another, the distribution keys KI, . . . included in the concatenated data items generated by the first decryption device; a content encryption key restoration device performing (k, n) threshold secret sharing scheme, based on the decryption key KI, . . . stored in the distribution key storage device, thereby restoring the content decryption key KM; a second decryption device decrypting the encrypted content item E(KM, C) stored in the storage device, based on the content decryption key KM restored; a second playback device playing back the content item C decrypted; a comparing device comparing the threshold value k with the number i of distribution keys stored in the distribution key storage device (i~i~n-l); a warning device monitoring the playback state in the first playback device and the result of comparison performed by the comparing device, thereby outputting a warning and first inquiry information when the number i of distribution keys is smaller than the threshold value k (i k) and when the playback state is either fast forwarding or skipping, the warning indicating that the content item C cannot be played back unless the playback state returns to one before the fast forwarding or skipping, and the first inquiry information asking whether the playback state should be returned to one before the fast forwarding or skipping; a playback position correction device correcting the position where the first playback device plays back the sub-content, to a position where the first playback device played back a sub-content before the fast forwarding or the skip is performed, when first response information requesting that the position should be so corrected is input in reply to the warning and the first inquiry information; and a distribution key deletion device erasing the distribution key acquired in the fast-forwarding state or skipping state from the distribution key storage device, when the first response information requesting that the position should not be so corrected is input in reply to the warning and the first inquiry information.

2. The user apparatus according to claim 1, further comprising: a playback information storage device storing playback time information representing the time for which playback has been performed until the first or second playback device stops playback; a device outputting second inquiry information based on the playback time information when the playback is performed again, the second inquiry information asking whether the playback should be resumed where it has been stopped, prompting a user to input second response information in reply to the second inquiry information; and playback control device controlling the first or second playback device, causing the same to resume the playback at the time represented by the playback time information when the second response information shows that the playback should be resumed where the playback has been stopped, and to perform the playback from the beginning when the second response information does not show that the playback should be so resumed.

3. The user apparatus according to claim 1, further comprising: a played-back sub-content storage device storing played-back sub-content ID information representing a sub-content played back by the first playback device; and a sub-content deletion device erasing the played-back sub-content ID information stored in the played-back sub-content storage device when the second playback device starts the playback, wherein the warning device refers to the played-back sub-content storage device in order to perform the playback again and outputs neither the warning or the first inquiry information if the result of inferring shows that the played-back sub-content storage device stores the played-back sub-content, even in the case where the number of distribution keys is smaller than the threshold value and the apparatus is in the fast-forwarding state or skipping state.

4. A program stored in a non-transitory computer-readable storage medium for use in a user apparatus that has a storage device communicating with a content distribution apparatus and having a storage device and a distribution key storage device, the program comprising: a first program code which causes the user apparatus to perform a process of writing, into the storage device, a threshold value k, sub-content item SCI, an encryption key KSC, n-l encrypted sub-content items E(KscI, KI//SC2), . . . , E(Ksc, Kn_I//SCn) and an encrypted content item E(KM, Cm), all received from the content distribution apparatus, when the content distribution apparatus encrypts a content to view, with a content encryption key KM, thereby generating an encrypted content item E(KM, C), performs (k, n) threshold secret sharing scheme on the content decryption key KM, using the threshold value k that is equal to or smaller than the number n of sub-content items SCI, . . . , SCn able to be played back before the content item C is played back, thereby generating n distribution keys KI, . . . , Kn_I, Kn (where 3~n) and a sub-content encryption key KSC, concatenates the n-i distribution keys KI, . . . , Kn_1 included in the n distribution keys to the n-i sub-content items SC2, . . . , SCn included in the n sub-content items, respectively, thereby generating n-l concatenated data items KI//SC2, . . . , Kn_I//SCn, encrypts the n-l concatenated data items KI//SC2, . . . , Kn_I//SCn, one by one, based on the sub-content encryption key KSC, thereby generating n-l encrypted sub-content items E(Ksc, KI//SC2), . . . , E(Ksc, Kn_I//SCn), and distributes one sub-content not included in the concatenated data items, the sub-content encryption key KSC, the n-i encrypted sub-content items E(Ksc, KI//SC2), . . . , E(Ksc, Kn_I//SCn) and the encrypted content item E(KM, C), one after another; a second program code which causes the user apparatus to perform a first decryption process of decrypting the encrypted sub-content items E(Ksc, KI//SC2), . . . , one after another, based on the sub-content encryption key KSC stored in the storage device, thereby generating the concatenated data items KI//SC2, . . . ; a third program code which causes the user apparatus to perform a first playback process of playing back, one after another, the first sub-content item SC1 stored in the storage device and stored sub-content items SC2, . . . included in the concatenated data items generated in the first decryption process; a fourth program code which causes the user apparatus to perform a process of storing, one after another, the distribution keys KI, . . . included in the concatenated data items generated in the first decryption process; a fifth program code which causes the user apparatus to perform a content encryption key restoration process of performing the (k, n) threshold secret sharing scheme, based on the decryption key KI, . . . stored in the distribution key storage device, thereby restoring the content decryption key KM; a sixth program code which causes the user apparatus to perform a second decryption process of decrypting the encrypted content item E(KM, C) stored in the storage device, based on the content decryption key KM restored; a seventh program code which causes the user apparatus to perform a second playback process of playing back the content item C decrypted; an eighth program code which causes the user apparatus to perform a comparing process of comparing the threshold value k with the number i of distribution keys stored in the distribution key storage device (i~i~n-l); a ninth program code which causes the user apparatus to perform a warning process of monitoring the playback state in the first playback process and the result of comparison performed in the comparing process, thereby outputting a warning and first inquiry information when the number i of distribution keys is smaller than the threshold value k (i k) and when the playback state is either fast forwarding or skipping, the warning indicating that the content item C cannot be played back unless the playback state returns to one before the fast forwarding or skipping, and the first inquiry information asking whether the playback state should be returned to one before the fast forwarding or skipping; a tenth program code which causes the user apparatus to perform a process of correcting the position where the sub-content is played back in the first playback process, to a position where the sub-content has been played back before the fast forwarding or the skipping, when first response information requesting that the position should be so corrected is input in reply to the warning and the first inquiry information; and an eleventh program code which causes the user apparatus to perform a process of deleting the distribution key acquired in the fast-forwarding state or skipping state from the distribution key storage device, when the first response information requesting that the position should not be so corrected is input in reply to the warning and the first inquiry information.

5. The program according to claim 4, further comprising:
a twelfth program code which causes the user apparatus to perform a process of writing playback time information representing the time for which playback has been performed until the first or second playback device stops playback, into a playback information storage device of the user apparatus;
a thirteenth program code which causes the user apparatus to perform a process of outputting second inquiry information based on the playback time information when the playback is performed again, the second inquiry information asking whether the playback should be resumed where it has been stopped, prompting a user to input second response information in reply to the second inquiry information; and
a fourteenth program code which causes the user apparatus to perform a process of controlling the first or second playback process, thereby resuming the playback at the time represented by the playback time information when the second response information shows that the playback should be resumed where the playback has been stopped, and to perform the playback from the beginning when the second response information does not show that the playback should be so resumed.

6. The program according to claim 4, further comprising:
a fifteenth program code which causes the user apparatus to perform a process of storing played-back sub-content ID information representing a sub-content played back in the first playback process; and
a sixteenth program code which causes the user apparatus to perform a process of deleting the played-back sub-content ID information stored in the played-back sub-content storage device when the second playback process is started,
wherein in the warning process, the played-back sub-content storage device is referred to, in order to perform the playback again, and neither the warning or the first inquiry information is output if the result of inferring shows that the played-back sub-content is stored, even in the case where the number of distribution keys is smaller than the threshold value and the user apparatus is in the fast-forwarding state or skipping state.

* * * * *